US012181570B2

(12) United States Patent
Urbanec et al.

(10) Patent No.: US 12,181,570 B2
(45) Date of Patent: Dec. 31, 2024

(54) SYNTHETIC RADIO ALTIMETER SYSTEM

(71) Applicant: Honeywell International Inc., Charlotte, NC (US)

(72) Inventors: Jan Urbanec, Brno (CZ); Gabriel Sarkozy, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 193 days.

(21) Appl. No.: 17/141,587

(22) Filed: Jan. 5, 2021

(65) Prior Publication Data

US 2022/0214445 A1   Jul. 7, 2022

(51) Int. Cl.
*G01S 13/88* (2006.01)
*G01S 13/935* (2020.01)
*G01S 19/10* (2010.01)

(52) U.S. Cl.
CPC .......... *G01S 13/882* (2013.01); *G01S 13/935* (2020.01); *G01S 19/10* (2013.01)

(58) Field of Classification Search
CPC ...... G01S 13/882; G01S 13/935; G01S 19/10; G01S 13/93; G08G 5/04; G08G 5/003; G01C 23/00
See application file for complete search history.

(56) References Cited

U.S. PATENT DOCUMENTS 6,157,891 A    12/2000 Lin
6,205,400 B1 *  3/2001 Lin .................. G01S 19/49
                                                701/472
6,507,289 B1    1/2003 Johnson et al.
6,785,594 B1    8/2004 Bateman et al.
7,145,501 B1   12/2006 Manfred et al.
(Continued)

FOREIGN PATENT DOCUMENTS

CN    111551149 A    8/2020
EP     1218772 B1    3/2004

OTHER PUBLICATIONS

Alberi et al., "Accuracy of Flight Altitude Measured with Low-Cost GNSS, Radar and Barometer Sensors: Implications for Airborne Radiometric Surveys", Sensors 2017, 17, 1889, Aug. 16, 2017, pp. 1 through 21, MDPI, www.mdpi.com/journal/sensors.

(Continued)

*Primary Examiner* — Timothy A Brainard
*Assistant Examiner* — Kenneth W Good
(74) *Attorney, Agent, or Firm* — Fogg & Powers LLC

(57) ABSTRACT

A synthetic radio altimeter system is provided. At least one sensor is used to generate sensor data that is used at least to determine a then current vehicle location. At least one controller is configured to determine an elevation of terrain under a vehicle based on the determined then current location of the vehicle and terrain information in the terrain database. The at least one controller is further configured to determine a height of the vehicle above terrain based at least in part on the determined elevation of terrain under the vehicle and the sensor data. The at least one controller further configured to augment the determined height of the vehicle above terrain with at least in part navigation database information when the vehicle is near one of a travel path origin and a travel path destination. The height above terrain may also be augmented based on a navigation radio.

20 Claims, 4 Drawing Sheets

(56) References Cited

U.S. PATENT DOCUMENTS

| | | | |
|---|---|---|---|
| 7,920,943 B2* | 4/2011 | Campbell | G05D 1/0676 |
| | | | 701/16 |
| 8,432,308 B2 | 4/2013 | Delga et al. | |
| 8,515,600 B1* | 8/2013 | McCusker | G01S 13/935 |
| | | | 340/963 |
| 9,342,988 B2 | 5/2016 | Bourret et al. | |
| 9,527,601 B2* | 12/2016 | Wyatt | G08G 5/025 |
| 10,459,085 B1* | 10/2019 | Bell | G01S 19/40 |
| 2006/0220920 A1* | 10/2006 | McCauley | G08G 5/0021 |
| | | | 340/963 |
| 2008/0243316 A1 | 10/2008 | Sacle et al. | |
| 2011/0199253 A1* | 8/2011 | Delga | G01S 13/87 |
| | | | 342/120 |
| 2014/0172202 A1 | 6/2014 | Greene | |
| 2015/0203214 A1* | 7/2015 | Bourret | G01C 23/005 |
| | | | 701/4 |
| 2017/0356757 A1* | 12/2017 | Bourret | G01C 21/005 |
| 2018/0075757 A1* | 3/2018 | Estes | G08G 5/0039 |
| 2020/0108931 A1* | 4/2020 | Zhou | A01M 7/0089 |
| 2020/0118449 A1* | 4/2020 | Rose | G01S 19/49 |
| 2020/0278676 A1* | 9/2020 | Tiana | G01S 7/412 |
| 2022/0189316 A1* | 6/2022 | Paul | G05D 1/0022 |

OTHER PUBLICATIONS

ATSB, "Synthetic vision display error involving Pilatus PC-12 VH-OWA", ATSB Transport Safety Report Aviation Occurence Investigation, AO-2016-064, Jan. 17, 2017, pp. 1 through 12, Australian Government Australian Transport Safety Bureau.

The Dutch Safety Board, "Crashed during approach, Boeing 737-800, near Amsterdam Schiphol Airport," Feb. 25, 2009, pp. 1 through 228, The Hague.

European Patent Office, "Extended European Search Report from EP Application No. 21217650.7", from Foreign Counterpart to U.S. Appl. No. 17/141,587, Jun. 13, 2022, pp. 1 through 8, Published: EP.

* cited by examiner

… (1)

SYNTHETIC RADIO ALTIMETER SYSTEM

BACKGROUND

A radio altimeter is part of an avionics system on aircrafts equipped with advanced avionics. Radio altimeters, as sensors, provide information about height above the terrain. This information is a critical and integral part of the avionics system and is used by many other avionics systems. Examples of such avionic systems that may use height above terrain information include automated flight control systems, synthetic vision systems, terrain awareness and warning systems, etc.

Depending on the aircraft's class and mission, there can be none, one, two or even more radio altimeter sensors installed, however in business aviation or even in air transport category aircrafts, a very common configuration is to have only a single radio altimeter installed. Having only one altimeter limits the ability of the automation and situational awareness systems to validate the correctness of the information provided. Data from the field suggests that the occurrence of radio altimeter sensor failures can cause erroneous height above terrain errors. This type of failure condition has led to multiple incidents and accidents.

In addition, lower class aircraft such as part 23 class 1 and class 2 aircraft typically do not have a radio altimeter installed as part of the avionics system due to installation challenges, weight and overall cost of this hardware sensor. Lack of a radio altimeter significantly limits capability to integrate advanced features that are becoming more and more desired for these lower classes of airplanes. Examples of such features that cannot be implementable without height above terrain information are runway overrun awareness systems (ROAAS), runway takeoff and landing advisory systems, assisted and emergency landing systems, autonomous takeoff systems, etc.

In the ideal situation, there is a desire to have dual independent radio altimeter system installed in the cockpit of aircraft to be able to validate information provided by the first radio altimeter, or to have a dissimilar system in the cockpit that would provide information that is the same or similar to the information provided by radio altimeter sensor for validation reasons.

SUMMARY

The following summary is made by way of example and not by way of limitation. It is merely provided to aid the reader in understanding some of the aspects of the subject matter described. Embodiments provide a synthetic radio altimeter system to determine a vehicle height above terrain. Once determined, an embodiment further augments the determined height above terrain with navigation database information when the vehicle is near one of travel path origin or a travel path destination. Further, some embodiments not only consider navigation database information but also other information such as, but not limited to, aircraft system data and navigation system data in determining, augmenting, validating, etc. a height above terrain.

In one embodiment, a synthetic radio altimeter system is provided. The system includes at least one sensor, at least one memory and at least one controller. The at least one vehicle sensor is used to generate sensor data that is used at least to determine a then current vehicle location. The at least one memory is used to store at least operating instructions and a terrain database. The at least one controller is in communication with the at least one sensor and memory. The at least one controller is configured to determine an elevation of terrain under a vehicle based on the determined then current location of the vehicle and terrain information in the terrain database. The at least one controller is further configured to determine a height of the vehicle above terrain based at least in part on the determined elevation of terrain under the vehicle and the sensor data. The at least one controller further configured to augment the determined height of the vehicle above terrain with at least in part navigation database information when the vehicle is near one of a travel path origin and a travel path destination.

In another example embodiment, a method of operating a synthetic radio altimeter system is provided. The method including determining vehicle position; determining an elevation of a terrain under the vehicle based on the determined vehicle position and a terrain database; determining a height of the vehicle above terrain using sensor data from at least one sensor and the determined elevation of the terrain; determining when the vehicle is near one of a travel path origin and a travel path destination; and when it is determined the vehicle is near one of the travel path origin and the travel path destination, using data from a flight management system and a navigation database to augment the terrain database with navigation database information relating to airfield/runway elevation.

In yet another embodiment, a computer-readable medium having computer executable instruction for performing the steps of operating a synthetic radio altimeter system is provided. The steps including determining a then current location of a vehicle; and using information from a flight management system, terrain data from a terrain database, sensor data and the then determined current location of the vehicle to determine a vehicle height above terrain when the vehicle is in a defined select near proximity to one of a travel path origin and a travel path destination, wherein the flight management system provides elevation of one of the travel path origin and the travel path destination as a reference.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
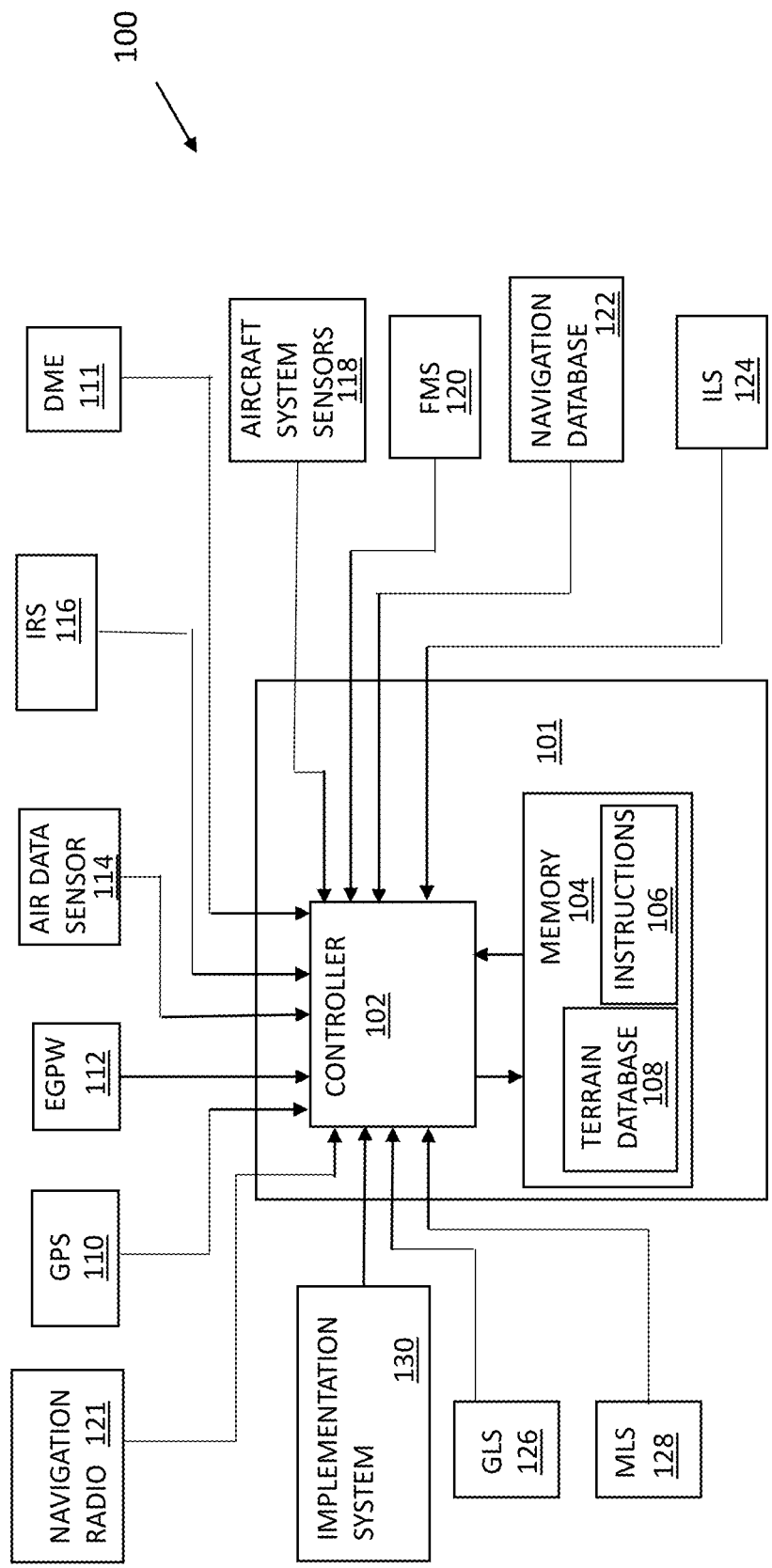
FIG. 1 is a block diagram of a synthetic radio altimeter system according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a synthetic radio altimeter system that determines a vehicle height above terrain. The determined vehicle height above terrain may be used in various different applications.

In one example embodiment, the determined height above the terrain information, that is based on terrain database data, is augmented based on navigational database data. The navigation database data has a relatively height degree of resolution for runway elevations. Hence, if an aircraft is taking off or is landing at an airport or runway, elevation provided from the navigation database is known. This can be compared to the vehicle height above terrain determined by the synthetic radio altimeter system. Any difference between the two can then be compensated for.

Once determined, an embodiment further augments the determined height above terrain with navigation database information when the vehicle is near one of travel path origin or a travel path destination. Whether a vehicle is near one of a travel path origin or travel path destination may be set by a defined distance determined by comparing a vehicles then current location with the location of the travel path origin or travel path destination or, in an embodiment, when a distant measurement equipment system between the vehicle and the travel path origin or travel path destination is within communication range of the travel path origin or travel path destination.

Further, embodiments provide a synthetic radio altimeter system for a vehicle that can be used, for example, in an aircraft with two radio altimeters, in an aircraft with a single radio altimeter and in an aircraft without a radio altimeter. In all three example applications, embodiments of the synthetic radio altimeter are implemented using a software component that may be executed on an existing avionics platform. Thus, some example application embodiments do not require installation of any additional hardware components than are already available in the aircraft. Further embodiments may utilize existing aircraft sensors, data provided by existing avionics systems, databases and external aircraft systems in generating altimeter data.

Regarding the aircraft with two radio altimeters example, a disadvantage of dual radio altimeter sensor system is that if values provided by the two sensors start deviating from each other, pilot judgement may need to be involved to be able to flag an incorrect sensor. Further, radio altimeter sensors installed on the aircraft are typically not dissimilar, thus they are subject to common mode failures. Hence, the common radio sensors may provide incorrect values at the same time. One advantage of a synthetic radio altimeter sensor of embodiments is that it is not subject to these common mode failures since the synthetic radio altimeter uses sensors independent from the radio altimeters to compute a height above terrain. Hence, height above terrain provided by a synthetic radio altimeter of an embodiment may be used to validate two existing radio altimeter outputs and act as a third source to flag incorrect radio altimeter outputs during non-correlation output situations. Synthetic radio altimeter embodiments are also capable to flag sudden, irrational changes in radio height indicated by conventional radio altimeters which are not corresponding with aircraft attitude and movements, thus identifying common mode failure conditions of conventional radio altimeters.

Regarding aircraft with a single radio altimeter, an embodiment provides a second, synthetic radio altimeter which may be used as second point of reference for the height above terrain. This helps to validate output of the conventional radio altimeter system and provide information to the crew when a variance threshold is crossed in an embodiment.

Further regarding aircraft without a radio altimeter, an embodiment provides an altitude solution without requiring a dedicated physical sensor. This is especially appealing for the lower-end market because it reduces cost of the avionics system shipset, the need for the physical installation, wiring, weight and complexity of the maintenance procedures. As mentioned above, in some embodiments, whichever radar altimeter configuration is present in the aircraft, when the aircraft is near a travel path origin or a travel path destination (airfield/runway) information from a navigation database may be used to augment a synthetic radio altimeter determination.

Referring to FIG. 1, a block diagram of a synthetic radio altimeter system 100 of an example embodiment is illustrated. This diagram represents a simplistic block diagram that identifies different sensors that are used by the synthetic radio altimeter sensor. The synthetic radio altimeter system 100 includes a control system 101 having a controller 102 and memory 104. In general, the controller 102 may include any one or more of a processor, microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller 102 may be part of a system controller or a component controller. The memory 104 may include computer-readable operating instructions 106 that, when executed by the controller 102 provides functions of the synthetic radio altimeter system 100. Such functions may include the functions of providing a height above terrain determination described below. The computer readable instructions 106 may be encoded within the memory 104. Memory 104 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other type of storage medium. In the example embodiment of FIG. 1, a terrain database 108 is stored in memory 104. In other embodiments, the terrain database 108 is stored at a remote location to the control system 101.

The control system 101, in this example synthetic radio altimeter system 100, receives information from sensor systems that may include, for example, a global positioning system (GPS) 110, an enhanced ground proximity warning system (EGPW) 112, air data sensor (ADS) 114, inertial reference sensor (IRS) 116, distance measuring equipment (DME) 111, aircraft system sensors 118, flight management system (FMS) (120), a navigation radio 121 and a navigation database (122). The navigation radio provides an input to the controller 102. The navigation database may include information relating to airfield/runway elevations. The system sensors 118 may include any number of different type of sensors for systems such as, but not limited to, barometric sensors and weight on wheel sensors. Further illustrated are an instrument landing system (ILS) 124, a microwave landing system (MLS) 128 and a ground based augmentation system landing system (GLS) 126. Based on the received information and the instructions 106 in the memory, the controller 102 in embodiments generates a synthetic altimeter solution (height above terrain).

The generated altimeter solution may be used by an implementation system 130. The implementation system 130 may include a readout device to display a determined height above terrain in aircraft without a radio altimeter. The implementation system 130 may also include a validation system for aircraft with one or more physical radio altimeter sensors installed. The implementation system 130 may further include an automated vehicle control system that controls operation of the vehicle based at least in part on the generated altimeter solution.

Figure 2:
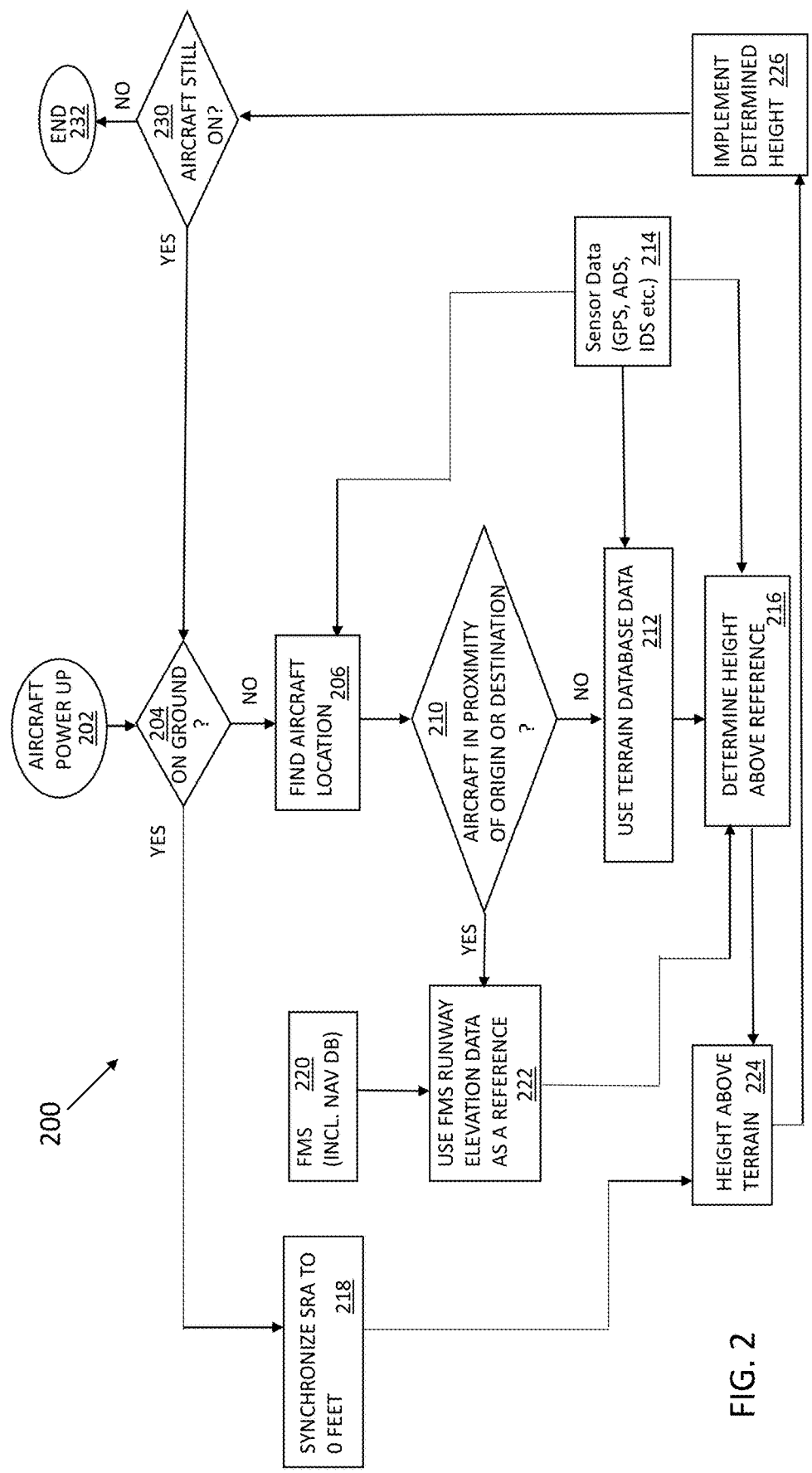
FIG. 2 is a synthetic radio altimeter flow diagram according to one exemplary embodiment.

An example of synthetic radio altimeter flow diagram 200 implemented by the synthetic radio altimeter system 100 illustrated FIG. 1 is illustrated in FIG. 2. The synthetic radio altimeter flow diagram 200 is provided as a series of sequential blocks. The sequence of the blocks may occur in parallel or in a different order. Hence, embodiments are not limited to the sequence set out in the synthetic radio altimeter flow diagram of FIG. 2.

The synthetic radio altimeter flow diagram 200 in this example starts at aircraft power up, illustrated in block (202). It is then determined if the aircraft in on the ground at block (204). In one embodiment this is done with an aircraft system sensor such as a weight on wheels sensor or an air speed sensor which are generally identified as aircraft system sensors 118. Regarding use of the air speed sensor, if a calibrated air speed is less than a predetermined threshold for a given vehicle, for example, using data from the air speed sensor, the controller 102 may determine the aircraft is on the ground.

If it is determined at block (204) the aircraft is on the ground, the synthetic radio altimeter system is set to zero feet at block (218). An error established during calibration to zero above ground by block (128) may also be used to synchronize other sensor altitude inputs used in systems to determine altitude, such as inputs of GPS altitude, EGPW altitude, barometric altitude, etc. (from the GPS 110, the EGPW 112, a barometric sensor (generally designated as being included in the aircraft system sensors 118) etc.), to compensate for potential offset of these sensors. An error may also be used to qualify offset of each sensor from true height and exclude sensors that are deemed unreliable based on this comparison from their further contribution to the determination of height above reference at block (216). Embodiments may also consider physical location and expected elevation of the surrounding terrain from terrain and navigation database (i.e. touch down zone elevation for departure runway) and altitude from all available sensors. This allows for determining errors in individual sensors and applying appropriate adjustments.

When it is determined at block (204) that the aircraft is not on the ground, the location (the physical latitude and longitude coordinates) of the aircraft is determined at block (206). In determining location of the aircraft at block (206), sensor data such as sensor data from a GPS 110, an IRS 116, etc. from block (214) may be used.

In an embodiment, once an aircraft transitions to air travel, GPS, air data altitude sources, inertial sources of vertical speeds and altitude, aircraft accelerations and rates as well as barometric sources of vertical speed are used to determine altitude increments from the takeoff location to find current aircraft altitude above runway, in order to compensate for the slow dynamic characteristics and response of some sensors. Embodiments also consider elevation of the terrain from the terrain database or EGWP system for given aircraft latitude and longitude position. In places, where resolution of the terrain database from block (212) is not sufficient and the aircraft is in proximity of the travel path origin or travel path destination (i.e. takeoff or landing runways) as determined in block (210), information about touch down zone elevation, for runways intended to perform takeoff and landing maneuvers, can be used as alternative or additional source of reference elevation data as illustrated in block (222). At block (222) runway elevation data, from the navigation database 122 is provided by the FMS 120 to block (222) from block (220). In an embodiment, the runway elevation is automatically used as a reference based on the runway selected as origin or destination by the crew as part of the crew's flight planning activities.

In the example synthetic radio altimeter flow diagram 200 of FIG. 2, a height above reference is determined in block (216). The height above reference at block (216) is determined from terrain data base information from block (212) and FMS runway elevation data as a reference from block (222) when the aircraft is in the proximity of the travel path origin or travel path destination as determined in block (210). The sensor data from block (214) is further used to determine the height above reference at block (216).

In this example embodiment, the height above terrain is then determined at block (224) from the determined height above reference at block (216) with the synthetic radio altimeter system synchronized at block (218). The height above terrain, determined at block (224), is then implemented at block (226). Implementation of the determined height may include providing a height above terrain readout in systems without a radio altimeter, a validation process for systems with a single altimeter and a validation of a system with two radar altimeters. Implementation may also include using the determined or validated height above terrain in controlling at least in part operation of the aircraft via the automated vehicle control system.

The process continuously repeats to provide a then current height above terrain as long as the vehicle is on in an embodiment. The example flow diagram 200 illustrates this feature at block (230) where it is determined if the aircraft is still on at block (230). If it is determined the aircraft is not still on at block (230), the process ends at block (232). If it is determined that the aircraft is still on at block (230), the process continues at block (204) determining if the aircraft is on the ground.

An embodiment of the synthetic radio altimeter system may also implement a weighing factor for individual sensors, protective mechanisms and checks for reasonableness to ensure that an output value is validated against other sources. Examples of such monitors and checks include inclusion of current navigation sensors estimated position uncertainty (EPU) and its validation against required navigation performance (RNP) as well as consideration of GPS and IRS lateral and vertical integrity limits etc. Examples using a weighing factor validation may use aircraft proximity sensors such as weight on wheel sensors, data from short range navigation sensors such as ILS 124, GLS 126 and MLS 128 lateral and vertical deviations, computed distance to land etc.

Further, the controller 102 may be configured, based on the operating instructions 106, to initialize, resynchronize and remove potential sensor biases using external navigation data from aircraft system sensors 118, such as data from xLS (ILS 124, GLS 126 and MLS 128) systems in the implementation block (226) of FIG. 2.

In one example embodiment, during landings and take-offs, similarly to the conventional radio altimeter sensor sources, height above terrain estimates computed by a synthetic radio altimeter embodiment may be considered as valid and used by all of the other systems as well as monitoring systems performing reasonableness check and comparison of such data with radio altitude when a value result is less than a select height and greater than a select height. For example, a considered valid range may be between 2500 ft and 5 ft. This, however, is just an example, other considered valid ranges may be used.

Figure 3:
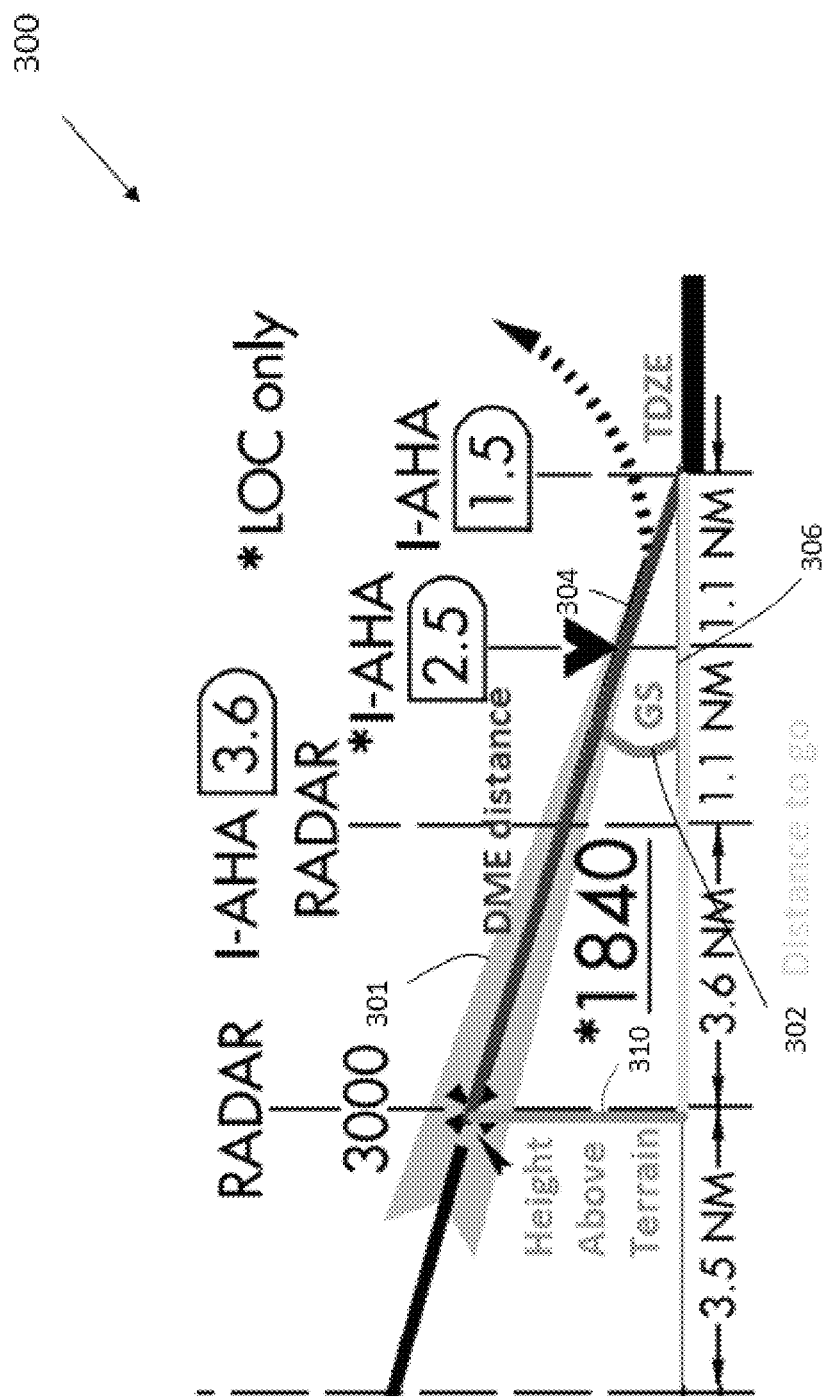
FIG. 3 is glidepath landing illustration according to one exemplary embodiment.
Figure 4:
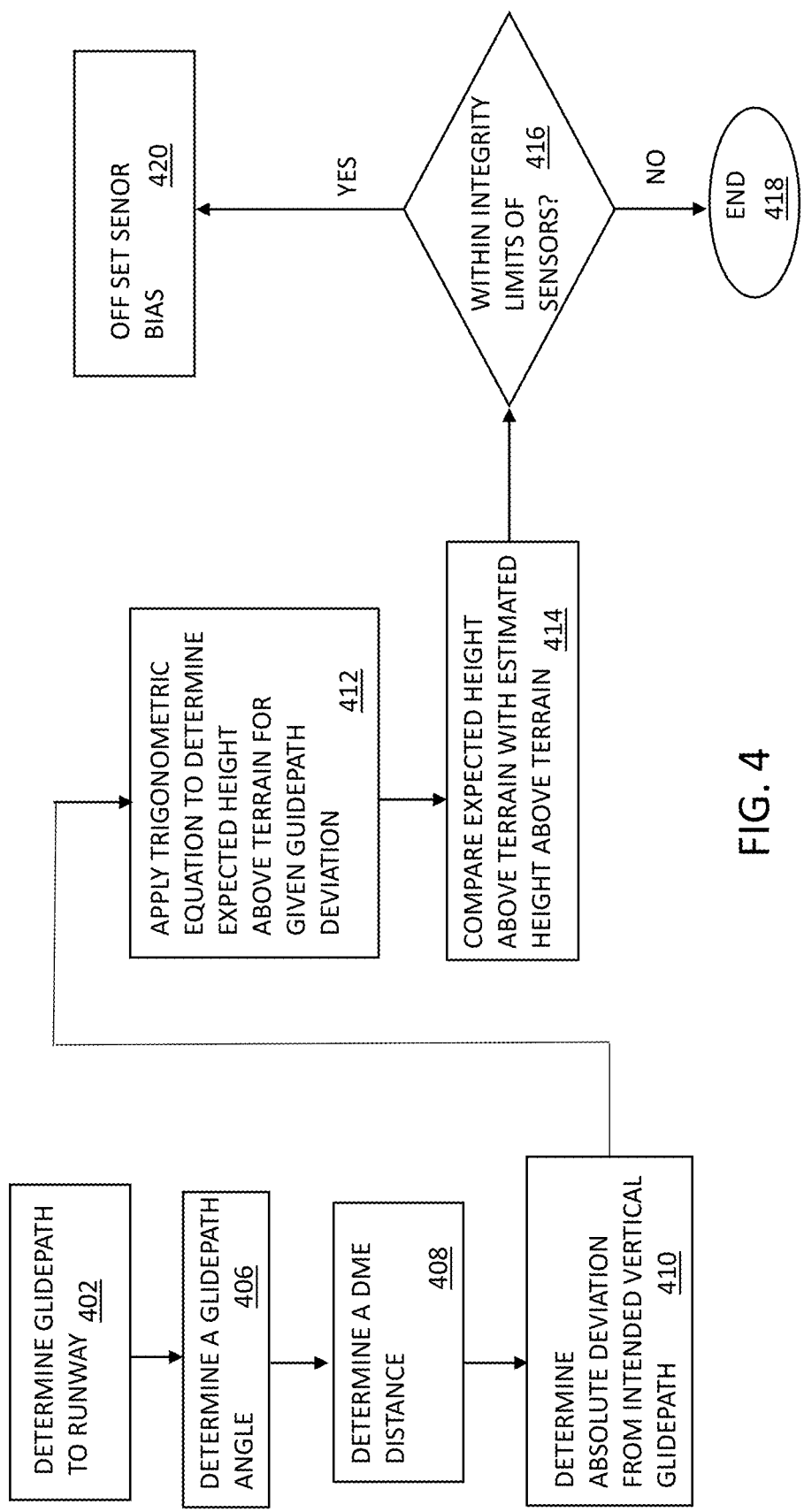
FIG. 4 is a synchronization flow diagram according to one exemplary embodiment.

A further example of an implementation in one example is illustrated in a glidepath landing illustration 300 of FIG. 3 and a synchronization flow diagram 400 of FIG. 4. The landing path illustration 300 shows a method for determining expected height above terrain while the aircraft uses instrument landing system deviation data. In a landing approach example of FIG. 3, a computing expected height above terrain 310 at a certain aircraft position during the approach is determined using touch down zone elevation height data, glidepath angle 302 provided by flight management system (FMS) 120 from the navigation database 122 and one of a DME distance 304 and/or a distance to go 306.

The synchronization flow diagram 400 is provided in a series of sequential blocks. The sequence of the blocks in flow diagram 400 may occur in a different order or even in parallel in embodiments. Hence, embodiments are not limited to the sequential order of blocks set out in FIG. 4. The synchronization flow diagram provides a method of synchronizing data for a synthetic radio altimeter based on instrument landing system deviation data.

The process starts at block (402) determining the glidepath to the runway 301 which may be provided by the FMS 120 in an example embodiment. The FMS 120 may be used at block (406) to determine the glidepath angle 302 illustrated in the glidepath landing graph 300. In this example embodiment, the DME 111 is used at block (408) to determine a slope range distance (DME distance 304) between the aircraft and a ground station (a DME unit at the ground station). The DME unit may be part of a very high frequency omni-directional range (VOR) ground station. The DME 111 includes a transceiver that is in communication with the ground station. In one example embodiment, the aircraft is near the travel path destination when the transceiver of the DME 111 is within range of an associated ground station at the travel path destination.

A position of the aircraft is determined at block (410). The position on the glidepath is determined in an example by knowing a vertical deviation from a beam of the navigation radio 121. Even when the aircraft is not positioned exactly on the glidepath, the magnitude of the angular and rectilinear deviations can be translated to determine absolute deviation from the intended vertical glidepath at block thus factoring this absolute deviation into triangular equation while computing expected height above terrain.

Considering a magnitude of deviation and applying a trigonometric equation to the distance to the runway (or DME distance), the glidepath angle, a touch down zone elevation (runway elevation) an expected height above terrain at a given aircraft location along the glidepath is determined at block (412). This computed expected height above terrain is then compared with the height above terrain already determined at block (224) of flow diagram 200 of FIG. 2 at block (414). In one example embodiment, the height above the terrain that was already determined at block (224) of flow diagram is augmented with the computed height above the terrain.

In still another embodiment, as illustrated in the synthetic radio altimeter application flow diagram 400 of FIG. 4, it is determined if synchronization is appropriate based on integrity limits of the sensors used at block (416), one time synchronization may also be performed during aircraft approach phase of flight as illustrated in block (420). This is equivalent to calibration of height above terrain when the aircraft is on the ground as discussed above. If, however, it is determined at block (416) that the synchronization is not appropriate based on integrity limits of the sensors, the process ends a block (418).

Accuracy of height above terrain estimates from the synthetic radio altimeter embodiments are related to the precision and refresh rate of data used and the resolution of the terrain database. The better the precision, the faster the refresh rate of the sensor data and the higher the resolution of the terrain data base, the better to determine small fluctuations of height between the aircraft body and terrain obstacles (buildings, small hills, trees etc.). Embodiments with a slower refresh rate, however, may be desirable for specific applications where height above terrain provided by a conventional radio altimeter is filtered with heavy lag filters to determine a smoothed trend for the use by an automatic flight control system.

EXAMPLE EMBODIMENTS

Example 1 is a synthetic radio altimeter system. The system includes at least one vehicle sensor, at least one memory and at least one controller. The at least one vehicle sensor is used to generate sensor data that is used at least to determine a then current vehicle location. The at least one memory is used to store at least operating instructions and a terrain database. The at least one controller is in communication with the at least one sensor and the at least one memory. The at least one controller is configured to determine an elevation of terrain under a vehicle based on the determined then current location of the vehicle and terrain information in the terrain database. The at least one controller is further configured to determine a height of the vehicle above terrain based at least in part on the determined elevation of terrain under the vehicle and the sensor data. The at least one controller further configured to augment the determined height of the vehicle above terrain with at least in part navigation database information when the vehicle is near one of a travel path origin and a travel path destination.

Example 2, includes the system of Example 1, further including a flight management system that is in communication with the at least one controller. The flight management system providing data used by the at least one controller to augment the determined height of the vehicle above terrain.

Example 3 includes the system of any of the Examples 1-2, wherein the at least one sensor includes at least one of a global positioning system sensor, a barometric sensor, an enhanced ground proximity warning system (EGPW), an air data sensor (ADS), an inertial reference sensor (IRS) and a distance measuring equipment (DME) sensor.

Example 4 includes the system of any of the Examples 1-3, further including an automated vehicle control system. The automated vehicle control system configured to control operation of the vehicle based at least in part on the determined vehicle height above terrain.

Example 5 includes the system of any of the Examples 1-4, wherein the at least one controller is further configured to validate a radio altimeter value with the determined height of the vehicle above terrain.

Example 6 includes the system of any of the Examples 1-5, wherein the at least one controller is further configured to determine the vehicle height above terrain based on the terrain database and the sensor data when the vehicle is not near one of the path of origin and the travel path destination.

Example 7 includes the system of any of the Examples 1-6, wherein the at least one controller is further configured to synchronize sensor outputs at least once when the vehicle is near one of the path of origin and the travel path destination.

Example 8 includes the system of Example 7, wherein the controller is further configured to synchronize the sensor outputs near the travel path destination by determining an intended glidepath to runway, determining a location of the vehicle on the intended glidepath, determining a range distance to the runway, applying a trigonometric equation to determine an expected height above terrain, comparing the expected height above terrain with the determined height of the vehicle above terrain and adjusting outputs of the at least one sensor based on the comparison when a result of the comparison is within an integrity limit of the at least one sensor.

Example 9 includes the system of Example 8, wherein the controller is further configured to determine an absolute deviation from the intended glidepath in determining the expected height above terrain.

Example 10 includes a method of operating a synthetic radio altimeter system. The method including determining vehicle position; determining an elevation of a terrain under the vehicle based on the determined vehicle position and a terrain database; determining a height of the vehicle above terrain using sensor data from at least one sensor and the determined elevation of the terrain; determining when the vehicle is near one of a travel path origin and a travel path destination; and when it is determined the vehicle is near one of the travel path origin and the travel path destination, using data from a flight management system and a navigation database to augment the terrain database with navigation database information relating to airfield/runway elevation.

Example 11 includes the method of Example 10, wherein the at least one sensor is at least one of a global positioning system sensor, a barometric sensor and an inertial reference sensor.

Example 12 includes the method of any of the Examples 10-11, further including determining if the vehicle is on the terrain; and when the vehicle is determined to be on the terrain and the determined height of the vehicle above terrain is not zero, removing bias in sensor data to match vehicle position on the ground to produce height above terrain to be zero.

Example 13 includes the method of any of the Examples 10-12, further including supplementing and validating a height above terrain determination from a radio altimeter of the vehicle with the determined height of the vehicle above terrain.

Example 14 includes the method of any of the Examples 10-13, further including determining an expected aircraft height of vehicle above terrain based on a vertical beam deviation, a final glide path angle and a distance to a destination; determining an absolute uncertainty of vehicle height above terrain based on integrity and precision uncertainties of the sensor data used to determine the height of the vehicle above terrain; and reducing bias errors of the sensor data used to determine the height above terrain with the determined expected aircraft height of vehicle above terrain and the determined absolute uncertainty of vehicle height above terrain.

Example 15 includes the method of any of the Examples 10-14, wherein the vertical beam deviation, the final glide path angle and the distance to a destination is determined by at least one of a landing system (ILS), a microwave landing system (MLS) and a ground based augmentation system landing system (GLS).

Example 16 includes the method of any of the Examples 10-15 further including adjusting processes using the sensor data to determine the height of the vehicle above terrain.

Example 17 includes a computer-readable medium having computer executable instruction for performing the steps of operating a synthetic radio altimeter system. The steps including determining a then current location of a vehicle; and using information from a flight management system, terrain data from a terrain database, sensor data and the then determined current location of the vehicle to determine a vehicle height above terrain when the vehicle is in a defined select near proximity to one of a travel path origin and a travel path destination, wherein the flight management system provides elevation of one of the travel path origin and the travel path destination as a reference.

Example 18 includes the medium of Example 17 further including providing at least one of initialization of sensors providing the sensor data, resynchronization of vehicle altimeter systems and removing sensor biases based at least in part on the determined vehicle height above terrain.

Example 19 includes the medium of any of the Examples 17-18, wherein the sensor data is provided by at least one of a global positioning system sensor, a barometric sensor, an enhanced ground proximity warning system (EGPW), an air data sensor (ADS), and an inertial reference sensor (IRS).

Example 20 includes the medium of any of the Examples 17-19, further including determining a glidepath of the vehicle and a glidepath angle with the flight management system; determining a distance to the one of the travel path origin and the travel path destination with a distance measurement device; determining the location of the vehicle on the glidepath with a location system; determining an expected vehicle height above terrain based on the glidepath angle, the determined distance to the one of the travel path origin and the travel path destination and the determined location of the vehicle on the glidepath; and synchronizing sensor outputs used to determine vehicle altitude based at least in part on a comparison of the determined expected vehicle height above terrain and the determined height above terrain.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A synthetic radio altimeter system, the system comprising:
at least one sensor to generate sensor data used at least to determine a then current vehicle location, the sensor data including at least latitude and longitude to determine the then current vehicle location and altitude sensor data;

at least one memory to store at least operating instructions and a terrain database; and at least one controller in communication with the at least one sensor and the at least one memory, the at least one controller configured to determine a current elevation of a terrain directly under a vehicle based on the determined then current location of the vehicle and terrain information in the terrain database, the at least one controller further configured to determine a current height of the vehicle directly above terrain based at least in part on the current determined elevation of terrain directly under the vehicle and the altitude sensor data, the at least one controller further configured to augment the determined current height of the vehicle directly above terrain with at least in part navigation database information that includes at least a height above reference of the terrain when the vehicle is near one of a travel path origin and a travel path destination, wherein a vehicle is near one of the travel path origin and the travel path destination when one of a defined distance to one of the travel path origin and the travel path destination is determined and when a transceiver of a distance measurement device of the vehicle is within a communication range of one of the travel path origin and the travel path destination.

2. The system of claim 1, further comprising:
a flight management system in communication with the at least one controller, the flight management system providing data used by the at least one controller to augment the determined current height of the vehicle directly above terrain.

3. The system of claim 1, wherein the at least one sensor includes at least one of a global positioning system sensor, a barometric sensor, an enhanced ground proximity warning system (EGPW), an air data sensor (ADS), an inertial reference sensor (IRS) and a distance measuring equipment (DME) sensor.

4. The system of claim 1, further comprising:
an automated vehicle control system, the automated vehicle control system configured to control operation of the vehicle based at least in part on the determined current height of the vehicle directly above terrain.

5. The system of claim 1, wherein the at least one controller is further configured to validate a radio altimeter value with the determined current height of the vehicle directly above terrain.

6. The system of claim 1, wherein the at least one controller is further configured to determine the current height of the vehicle directly above terrain based on the terrain database and the sensor data when the vehicle is not near one of the path of origin and the travel path destination.

7. The system of claim 1, wherein the at least one controller is further configured to synchronize sensor outputs at least once when the vehicle is near one of the path of origin and the travel path destination.

8. The system of claim 7, wherein the controller is further configured to synchronize the sensor outputs near the travel path destination by determining an intended glidepath to runway, determining a location of the vehicle on the intended glidepath, determining a range distance to the runway, applying a trigonometric equation to determine an expected height above terrain, comparing the expected height above terrain with the determined current height of the vehicle directly above terrain and adjusting outputs of the at least one sensor based on the comparison when a result of the comparison is within an integrity limit of the at least one sensor.

9. The system of claim 8, wherein the controller is further configured to determine an absolute deviation from the intended glidepath in determining the expected height above terrain.

10. A method of operating a synthetic radio altimeter system, the method comprising:
determining a vehicle latitude and longitude position;
determining an elevation of a terrain directly under the vehicle based on the determined vehicle latitude and longitude position and a terrain database;
determining a current height of the vehicle directly above terrain using sensor data from at least one sensor that provides altitude data and the determined elevation of the terrain;
determining when the vehicle is near one of a travel path origin and a travel path destination, wherein a vehicle is near one of the travel path origin and the travel path destination when one of a defined distance to one of the travel path origin and the travel path destination is determined and when a transceiver of a distance measurement device of the vehicle is within a communication range of one of the travel path origin and the travel path destination; and
when it is determined the vehicle is near one of the travel path origin and the travel path destination, using data from a flight management system and a navigation database to augment the terrain database with navigation database information used to determine a height above reference of the terrain with airfield/runway elevation information.

11. The method of claim 10, wherein the at least one sensor is at least one of a global positioning system sensor, a barometric sensor and an inertial reference sensor.

12. The method of claim 10, further comprising:
determining if the vehicle is on the terrain; and
when the vehicle is determined to be on the terrain and the determined current height of the vehicle directly above terrain is not zero, removing bias in sensor data to match vehicle position on the ground to produce a height above terrain to be zero.

13. The method of claim 10, further comprising:
supplementing and validating a height above terrain determination from a radio altimeter of the vehicle with the determined current height of the vehicle directly above terrain.

14. The method of claim 10, further comprising:
determining an expected aircraft height of vehicle above terrain based on a vertical beam deviation, a final glide path angle and a distance to a destination;
determining an absolute uncertainty of vehicle height above terrain based on integrity and precision uncertainties of the sensor data used to determine the current height of the vehicle directly above terrain; and
reducing bias errors of the sensor data used to determine the current height of the vehicle directly above terrain with the determined expected aircraft height of vehicle above terrain and the determined absolute uncertainty of vehicle height above terrain.

15. The method of claim 14, wherein the vertical beam deviation, the final glide path angle and the distance to a destination is determined by at least one of an instrument landing system (ILS), a microwave landing system (MLS) and a ground based augmentation system landing system (GLS).

16. The method of claim 14, further comprising:
adjusting processes using the sensor data to determine the current height of the vehicle directly above terrain.

17. A computer-readable medium having computer executable instruction for performing the steps of operating a synthetic radio altimeter system comprising:

determining a then current latitude and longitude location of a vehicle; determining a height above a reference of the terrain using information from a flight management system, terrain data from a terrain database, altitude sensor data and the then determined current location of the vehicle when the vehicle is in a defined select near proximity to one of a travel path origin and a travel path destination, wherein the flight management system provides an elevation of one of the travel path origin and the travel path destination as the reference; and determining a current height of a vehicle directly above the terrain based at least in part on the determined height above the reference of the terrain.

18. The medium of claim 17, further comprising:

providing at least one of initialization of sensors providing the sensor data, resynchronization of vehicle altimeter systems and removing sensor biases based at least in part on the determined current height of the vehicle directly above terrain.

19. The medium of claim 17, wherein the sensor data is provided by at least one of a global positioning system sensor, a barometric sensor, an enhanced ground proximity warning system (EGPW), an air data sensor (ADS), and an inertial reference sensor (IRS).

20. The medium of claim 17, further comprising:

determining a glidepath of the vehicle and a glidepath angle with the flight management system;

determining a distance to the one of the travel path origin and the travel path destination with a distance measurement device;

determining the location of the vehicle on the glidepath with a location system;

determining an expected vehicle height above terrain based on the glidepath angle, the determined distance to the one of the travel path origin and the travel path destination and the determined location of the vehicle on the glidepath; and synchronizing sensor outputs used to determine vehicle altitude based at least in part on a comparison of the determined expected vehicle height above terrain and the determined current height of the vehicle directly above terrain.

* * * * *